United States Patent Office 2,975,328
Patented Mar. 14, 1961

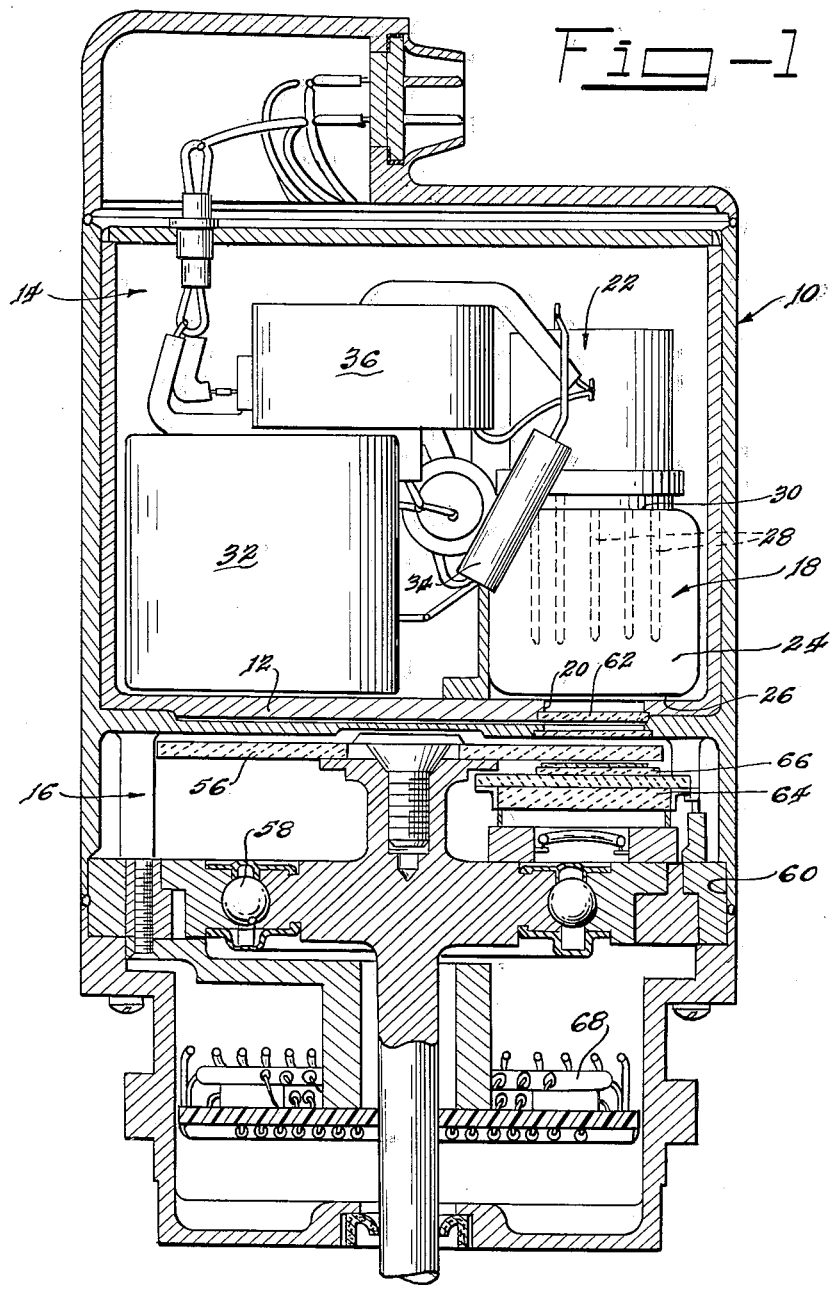

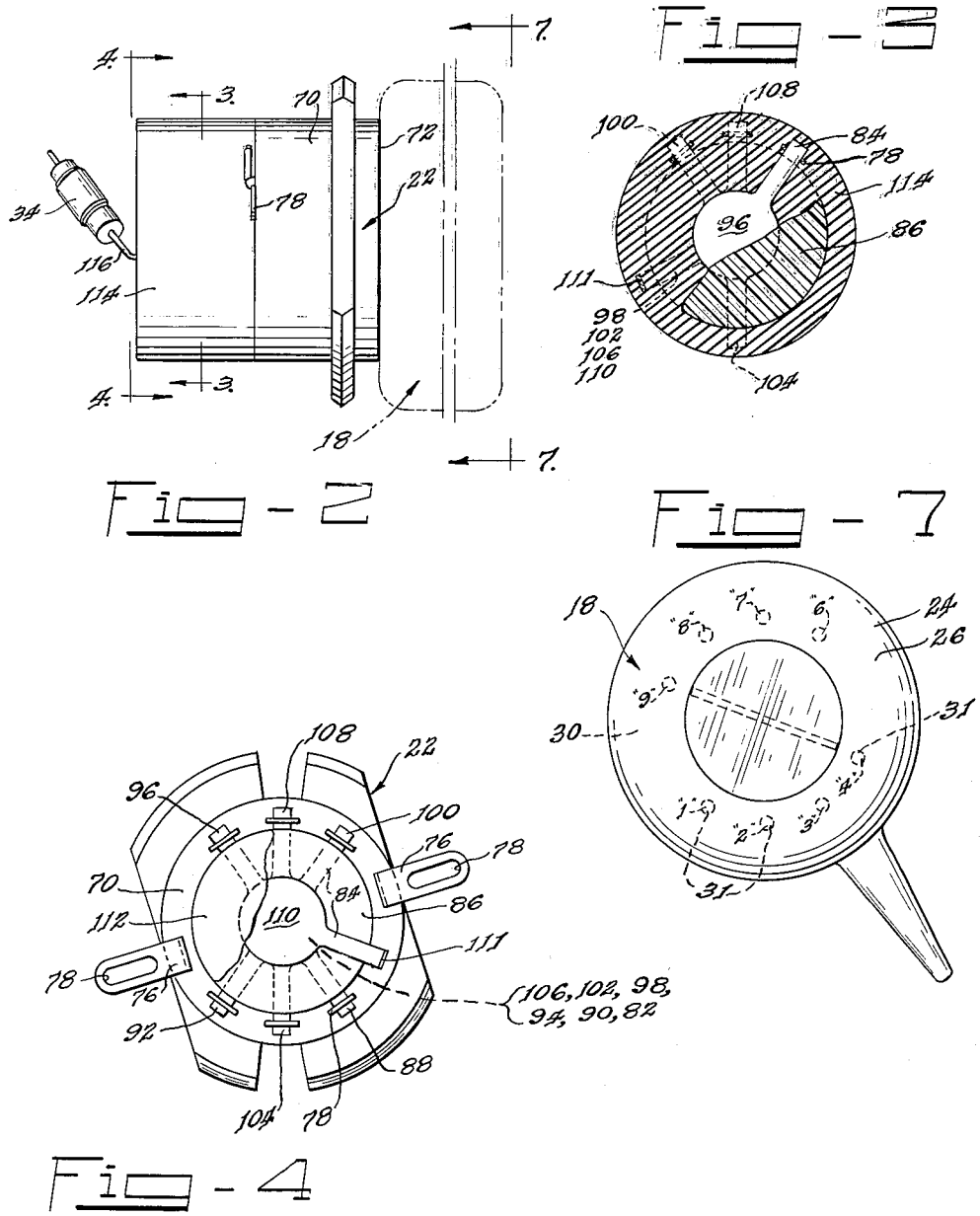

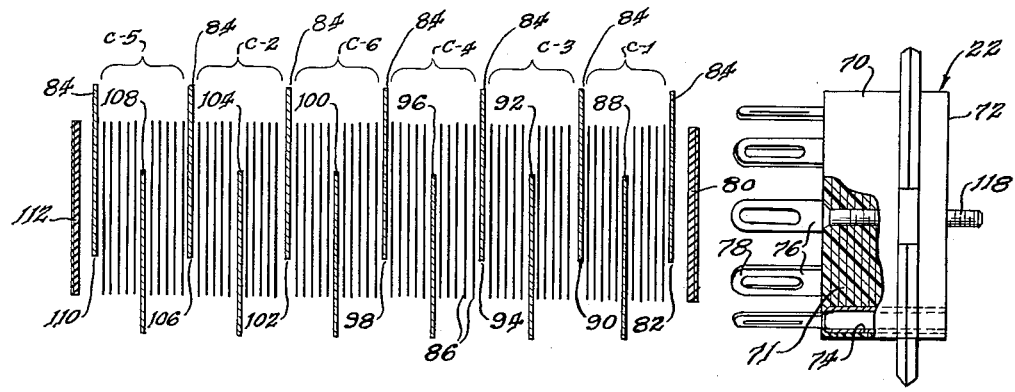
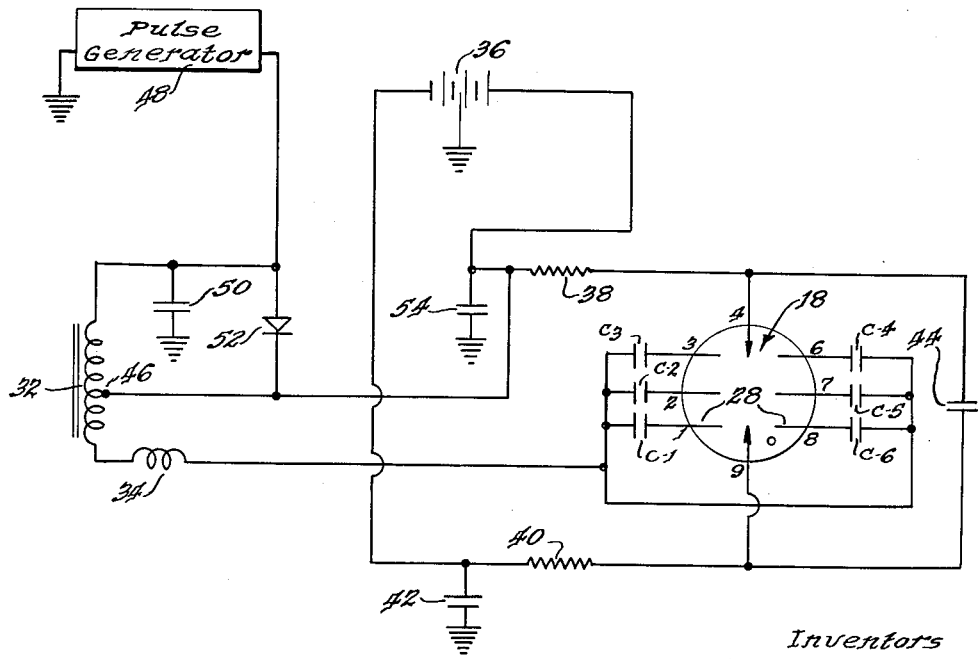

2,975,328

FLASH LAMP ASSEMBLY

Rudolf Ludeke and Marion B. Gregory, Cincinnati, Ohio, assignors to The Baldwin Piano Company, Cincinnati, Ohio, a corporation of Ohio Filed Jan. 5, 1960, Ser. No. 604

7 Claims. (Cl. 315—59)

The present invention relates to flash lamp devices generally and to assemblies of sockets and capacitors.

Photoelectric encoders are employed for encoding analog information into digital form. A photoelectric encoder generally employs a code disc having a plurality of coaxial tracks of adjacent opaque and transparent sectors. A flash lamp is positioned on one side of such a code disc, and a photocell is positioned on the opposite side of the code disc adjacent to each track thereof. The illumination from the flash lamp is confined to a radial sectior of the code disc, and the photocells respond to each flash of the flash lamp only when the flash occurs at a time in which a transparent sector of the confronting track is aligned with the photocells.

The flash lamp devices for such optical encoders have proven to be a source of considerable difficulty. A pulse is employed to initiate each flash of the flash lamp, and it is necessary for the lamp to promptly respond to the pulse in order to achieve interrogation of the code disc at the proper instant. Also, flash lamps have had relatively short lives and often fail to provide adequate illumination. These difficulties have caused a continuous search for more reliable and faster responding flash lamps.

A flash lamp has recently been developed which employs a first pair of spaced electrodes and a plurality of firing electrodes disposed on opposite sides of the axis between the first pair of electrodes. Each of the firing electrodes is connected to a pulse source through a capacitor, and an arc discharge results along the axis between the first pair of electrodes in response to a triggering pulse applied simultaneously to the capacitors connected to the firing electrodes. This flash lamp construction has proven to be superior to those previously known; however, the additional space required for the capacitors has proven to be a limitation to the use of this flash lamp. Many optical encoders are employed in restricted spaces, and it is one of the objects of the present invention to provide a flash lamp assembly which can be constructed in a small volume.

It has also proven to be costly and difficult to connect each of the capacitors required in a flash lamp construction of the type described above, particularly because of the restricted space in which the flash lamp assembly is used, because of the relatively high potentials involved and because of associated radiation which is minimized with this compact construction. It is therefore an object of the present invention to provide a combination flash lamp and socket assembly which includes the requisite capacitors for the flash lamp.

These and further objects of the present invention will be more fully appreciated upon a further consideration of this disclosure, particularly when viewed in the light of the drawings, in which:

Figure 1 is a sectional view of an optical encoder utilizing the teachings of the present invention;

Figure 2 is an elevational view of the tube socket and capacitor assembly illustrated in Figure 1;

Figure 3 is a sectional view taken along the line 3—3 of Figure 2;

Figure 4 is an elevational view taken along the line 4—4 of Figure 2, the potting compound having been removed for clarity;

Figure 5 is an exploded view of the capacitor and tube socket assembly;

Figure 6 is a schematic electrical circuit diagram of the flash lamp construction employed in the encoder of Figure 1; and Figure 7 is a top elevational view of the flash lamp employed in the encoder of Figure 1.

The encoder illustrated in Figure 1 employs a cylindrical housing 10 which is approximately 2½ inches in diameter in the particular construction illustrated. The housing is provided with a wall partition 12 which extends normal to the axis of the housing 10 and divides the housing into a compartment 14 for the flash lamp assembly and a compartment 16 which contains the mechanical elements and some of the electrical elements of the encoder.

The flash lamp assembly employs a flash lamp 18 which is mounted within the compartment 14 confronting an opening in the partition 12. The flash lamp 18 is also mounted on a socket and capacitor assembly 22. The flash lamp 18 is provided with an air impermeable transparent shell 24 which has a flat surface 26 confronting the opening 20 of the partition 12 of the housing 10. Eight pins, designated 28, extend into the shell 24 from a base 30 of the flash lamp 18, the base 30 being parallel to the flat surface 26 thereof and abutting the tube socket and capacitor assembly 22. The pins 28 are connected to contact prongs 31 which extend normally from the base 30 of the tube, and the pins connected to contact prongs numbered 4 and 9 form the discharge gap and are disposed on a radius of the cylindrical housing 10. Pins connected to the prongs numbered 1, 2, 3, 6, 7, and 8 form the firing electrodes which extend from the perimeter of the tube 18 and terminate adjacent to the axis between the pins 4 and 9. In use, the flash will first commence adjacent to one of the discharge gap electrodes and thereafter travel toward the other of said discharge gap electrodes so that the resulting flash is essentially a straight line between the gap electrodes.

The first, second, third, sixth, seventh, and eighth contact prongs 31 of the flash lamp 18 are connected to capacitors designated C1, C2, C3, C4, C5, and C6, respectively, in Figure 6, these capacitors being incorporated in a single assembly within the socket and capacitor assembly 22 as will be described hereinafter. The terminal of each of these capacitors remote from the flash lamp 18 is connected to each of the other remote terminals, and to a transformer 32 through a choke 34. The fourth contact prong 31 of the flash lamp 18 is connected to the positive terminal of a direct current power source indicated by the battery 36 through a resistor 38, and the ninth prong 31 is connected to the negative terminal of the power source 36 through a resistor 40, the center tap of the power source 36 being grounded. The negative terminal of the power source 36 is bypassed to ground through a capacitor 42, and a capacitor 44 is connected between the fourth and ninth prongs 31 of the flash lamp 18.

The transformer 32 is also provided with a tap 46 which is connected to the positive terminal of the power source 36. The end of the transformer remote from the choke 34 is connected to a trigger pulse generator 48 and bypassed to ground by a capacitor 50. A diode 52 is connected between the trigger pulse generator 48 and the tap of the transformer 46 to pass positive charges to the tap. Also, a capacitor 54 bypasses the positive terminal of the power source 36 to ground.

Since the pulses produced by the trigger pulse generator 48 are applied in series with the portion of the transformer 32 between the tap 46 and the trigger pulse generator 48, a potential is generated in the transformer 32 determined by the shape of the trigger pulse. This potential is multiplied by the turns ratio of the transformer and conducted through the choke 34 to the capacitors C1, C2, C3, C4, C5, and C6 to the firing electrodes of the flash lamp 18. As a result of the potential placed on the firing electrodes, an arc discharge occurs adjacent to the discharge electrode connected to prong 9, thus causing the potential of the firing electrode connected to prong 8 to fall. Were it not for capacitor C6 which is capable of providing sufficient charge to isolate the other firing electrodes, the discharge would end there; however, because of the isolation achieved by capacitors 1 through 6, the discharge proceeds rapidly between the discharge electrodes of the tube 18.

In practice, the peak of the pulse applied through the choke 34 to the capacitors C1, C2, C3, C4, C5, and C6 is approximately 3500 volts, and the capacitors have a capacity of approximately 10 micromicrofarads.

A code disc 56 is rotatably mounted within the compartment 16 on a ball bearing assembly 58. The ball bearing assembly 58 is secured to an indentation 60 in the cylindrical surface of the housing 10. The code disc 58 is of the type described in the patent application of Edward M. Jones entitled "Optical Encoder," Serial No. 655,653, filed April 29, 1957, and embodies a plurality of coaxial tracks of adjacent opaque and transparent sectors.

The code disc 56 confronts the opening 20 in the partition 12 of the housing 10, and a transparent plate 62 seals the code disc 56 and the compartment 16 from the compartment 14. Also disposed within the compartment 16 is a photocell assembly 64 which in the particular construction is of the type disclosed in the application of Hugle and Hugle entitled "Photocells and Method of Manufacturing Photocells," Serial No. 791,400, filed February 5, 1959. The photocell assembly is rigidly mounted to the housing 10, and a part cylindrical lens 66 is disposed between the photocell assembly 64 and the code disc 56. The axis between the fourth and ninth pins 28 of the flash lamp 18, the sensitive axis of the photocell assembly 64, and the axis of the part cylindrical lens 66 are all on a common plane normal to the plane of the code disc 56 and on a radius thereof. The number of photocells in the photocell assembly 64 is equal to the number of coaxial tracks on the code disc 56, and each of the photocells in the assembly 64 is connected to an amplifier housed within the compartment 16, these amplifiers being designated 68. The output of the amplifiers 68 may be used in any of the conventional manners, such as the manners disclosed in the Jones application referred to above.

The construction of the flash lamp socket and capacitor assembly 22 is best illustrated in Figures 2, 3, 4, and 5. This assembly 22 includes a tube socket portion 70 with a body 71 of insulating material which has a surface 72 which abuts the base 30 of the flash lamp 18. Nine parallel equally spaced channels 74 extend through the body of the tube socket portion 70 normal to the surface 72, and each of these channels 74 contains a contact member with a prong engaging portion 74 which clamps a prong 31 of the flash lamp 18 disposed within that particular channel 74. Each contact member also has a lug portion 78 extending from the surface of the socket body 71 opposite the surface 72. The capacitors C1, C3, C4, C6, C2, and C5 are mounted in that order from the tube socket body between the lug portions 78.

An annular layer 80 of insulating material having a diameter slightly less than the distance between the lug portions 78 is secured to the surface of the socket body 71 opposite the surface 72 between the lug portions 78. Immediately adjacent to this layer 80 is an annular plate 82 of smaller diameter and of electrically conducting material. The plate 82 is provided with an outwardly extending strip 84. The plate 82 is a part of a common capacitor element, and it will therefore be interconnected with the other plates of the common capacitor element, as indicated hereafter. A plurality of electrically insulating discs 86 are disposed adjacent to the conducting plate 82, and a conducting disc 88 abuts the side of the stack of discs 86 opposite the plate 82. This disc 88 also has an outwardly extending strip 84 which is soldered to the first lug portion of the socket 70, the first lug portion of the socket portion 70 being keyed to receive the first prong 31 of the flash lamp 18. In like manner, a plurality of electrically insulating discs abut the disc 88, and an electrically conducting plate 90 abuts this stack of electrically insulating discs on the side thereof opposite the electrically conducting disc 88. The plate 90 also is a part of the common capacitor element, and it is provided with an electrically conducting strip 84 which is aligned with the strip 84 of the plate 82.

It will be seen that the electrically conducting plates 82 and 90 form the common terminals of the capacitor C1, and the electrically conducting disc 88 is the other terminal of capacitor C1. In other words, capacitor C1 comprises the two capacitances formed between the disc 88 and the plates 82 and 90.

The plate 90 forms one of the common terminals of capacitor C3, capacitor C3 being assembled immediately adjacent to capacitor C1. Capacitor C3 has a central disc 92 which corresponds to the disc 88 of capacitor C1, and this disc 92 is connected mechanically and electrically through a strip 84 to the second of the lug portions of the socket portion 70. Capacitor C3 also has a second common plate, designated 94, which has an electrically conducting strip portion 84 aligned with the strip portions of the plates 82 and 90.

Capacitor C4 utilizes the plate 94 in common with capacitor C3 and is provided with an electrically conducting disc 96 and plate 98 which are spaced from each other by electrically insulating discs 86. The disc 96 of capacitor C4 is electrically connected to the sixth lug portion of the socket portion 70, and the electrically conducting strip 84 of the plate 98 is aligned with the strips of the discs 94, 90, and 82.

Capacitor C6 is mounted immediately adjacent to capacitor C4 and includes an electrically conducting disc 100 and plate 102 which are separated by insulating discs 86. In like manner, the capacitor C2 is mounted immediately adjacent to the capacitor C6 and employs an electrically conducting disc 104 and plate 106. Finally, capacitor C5 is mounted immediately adjacent to capacitor C2 and employs an electrically conducting disc 108 and plate 110. The electrically conducting discs 82, 90, 94, 98, 102, 106 and 110 have their electrically conducting strips 84 aligned, and these strips are interconnected in a common strip designated 111, as indicated in Figures 3 and 4. An electrically insulating disc 112 abuts the disc 110.

The electrically conducting plates and discs and the insulating layers are secured in a rigid assembly which is fixed with potting compound, as best illustrated in Figures 2, 3 and 4, the potting compound being designated 114. The fourth and ninth lug portions of the socket portion 70 are bent normal to the other lug portions 78 and extend outwardly from the potted assembly. Since the fourth and ninth lug portions are connected to the positive and negative terminals of the power source 36, these connections may be readily made as indicated in Figures 1 and 2. Also, as indicated in these figures, one lead 116 from the RF choke 34 is wrapped around the common strip 84 of the plate 110 and soldered into place, and this lead is potted in this position.

In practice, it has been found that the electrically insulating layers between the conducting plates and discs are preferably Mylar discs, and the discs 80 and 112 are preferably of epoxy glass. The discs and plates of electrically conducting material may be of copper, brass, aluminum, for example.

It has been found convenient and preferable to mount the socket portion 70 in a supporting jig by means of a screw 118 which protrudes from the surface 72 and which has a head countersunk into the socket body 71. The epoxy glass layer 80 may then be cemented into position, and thereafter the electrically conducting plates and discs and electrically insulating layers stacked directly on the socket body 71. The electrically conducting discs are immediately soldered to the intended lug portions 78, and the common electrically conducting plates are interconnected when the stack has been completed. Thereafter, the entire stack is placed within a form which is filled with potting compound to provide the desired electrical properties even in the presence of high humidity conditions.

Referring again to Figure 1, it will be noted that a flash lamp assembly of extremely compact size has been provided. Further, it will be noted that the flash lamp employed requires the capacitors C1, C2, C3, C4, C5 and C6, and that these capacitors have been constructed in a minimum of space in a single assembly with the tube socket. This construction, it will be appreciated, has reduced to three the number of leads required to actuate the flash lamp 18.

Those skilled in the art will readily devise many modifications to the present invention which are within the intended scope hereof. It is therefore intended that the scope of the present invention be not limited by the foregoing disclosure, but rather only by the appended claims

The invention claimed is:

1. A socket and capacitor assembly for use with a part having a plurality of parallel outwardly extending contact prongs which must be capacitively coupled to a common electrical element comprising a socket body of electrically insulating material having a face and surface on the side thereof opposite the face, said body having a plurality of parallel passageways extending therethrough and spaced about a common axis normal to the face, a contact member disposed in each passageway having a prong engaging portion confronting the face and a lug portion extending outwardly from the surface thereof, a common capacitor element mounted on the surface of the socket body and disposed between the lug portions of the contact members, and means capacitively coupling said lug portions to the common capacitor element.

2. A socket and capacitor assembly for use with a tube having a plurality of outwardly extending contact prongs, a first group of which must be capactively coupled to a common terminal and a second group of which are connected to other terminals of an electrical circuit, comprising, in combination: a socket body of electrically insulating material having a face and a surface on the opposite side of the body from the face, said body having a plurality of parallel passageways extending therethrough and spaced about a common axis normal to the face; a contact member disposed within each passageway having a prong engaging portion confronting the face and a lug portion extending outwardly from the surface of the body; a common capacitor element mounted on the surface of the socket body and disposed between the lug portions of the contact members, means for capacitively coupling the lug portions of a first group of the contact members to the common capacitor element; a mass of electrically insulating material disposed about the lug portions from the surface of the body of the socket, the common capacitor element and the means for capacitively coupling the first group of lug portions to the common capacitor element; and electrical contact means electrically connected to the common capacitor element, the lug portions of the second group of contact members extending through the mass of insulating material to the exterior thereof.

3. A socket and capacitor assembly for use with a tube having a plurality of outwardly extending contact prongs, a first group of which must be capacitively coupled to a common terminal and the second group of which are adapted to be connected to other terminals of an electrical circuit comprising the elements of claim 2 wherein the common capacitor element comprises a plurality of spaced parallel electrically conducting plates disposed generally parallel to the surface of the socket body and an electrically conducting strip disposed normal to the plates and connected to each of the plates, and the means for capacitively coupling the lug portions of the first group of contact members to the common capacitor element comprises an electrically conducting plate disposed between two of the plates of the common capacitor element and electrically insulated therefrom.

4. A flash lamp assembly comprising, in combination: a socket body of electrically insulating material having a face and a parallel surface on the side thereof opposite the face, said body having a plurality of parallel passages extending therethrough and spaced at a common distance about a common axis normal to the face; a contact member disposed within each passageway having a prong engaging portion confronting the face and a lug portion extending normally from the surface of the body; a plurality of electrically conducting plates disposed parallel to the surface and within the lug portions of the contact members, a layer of electrical insulation disposed between adjacent plates, means interconnecting alternate plates to form a common capacitor element, a flash lamp having outwardly extending contact prongs confronting the face of the socket body with each of the contact prongs engaged within a prong engaging portion of a contact member, an even numbered group of the contact prongs of said tube being connected to firing electrodes of said tube, and means for electrically connecting the lug of each contact member engaging a contact prong of said group to one of the plates disposed between the plates of the common capacitor element.

5. A flash lamp assembly comprising the elements of claim 4 wherein the means for electrically connecting the lugs to the electrically conducting plates comprises an electrically conducting strip integral with each plate, each strip being mechanically mounted on the lug electrically connected to said plate.

6. A flash lamp assembly comprising the elements of claim 4 in combination with a choke electrically connected to the common capacitor element and mounted thereon.

7. A flash lamp assembly comprising, in combination: a socket body of electrically insulating material having a face and a parallel surface on the side thereof opposite the face, said body having eight parallel passages extending therethrough and spaced at a common distance about a common axis normal to the face; a contact member disposed within each passageway having a prong engaging portion confronting the face and a lug portion extending from the surface of the body; a flash lamp having eight outwardly extending contact prongs confronting the face of the socket body with each of the contact prongs engaged within a prong engaging portion of a contact member, six of said prongs being connected to firing elements of said tube and two of said prongs being connected to arc discharge elements of said tube, the lugs of the contact members engaging the six prongs extending normally from the surface and the other two lugs extending outwardly from the socket body approximately parallel to the surface of the socket body; an electrically conducting disc having a flat strip portion integral therewith and in the plane thereof mechanically and electrically connected to each of the six lug portions, said strip portions maintaining the discs in spaced relationship parallel to the surface; an electrically conducting plate disposed on each side of each disc, said plates having outwardly extending strips integral therewith and the strips being electrically interconnected; a layer of electrical insulating material disposed between each confronting disc and plate; a mass of electrically insulating hermetic sealing material disposed about the lug portions from the surface of the socket body and encasing the plates and discs, the two lug portions extending outwardly from the sealing material; and a choke mounted on the strip of the plate remote from the surface of the socket body and electrically connected thereto, said choke extending to the exterior of the sealing material.

No references cited.